United States Patent [19]

Stewart

[11] 4,147,427
[45] Apr. 3, 1979

[54] VARIABLE WORKING DISTANCE PHOTOGRAPHIC PRINTER WITH STATIONARY PAPER MAGAZINES

[75] Inventor: James F. Stewart, Shoreview, Minn.

[73] Assignee: Pako Corporation, Minneapolis, Minn.

[21] Appl. No.: 880,897

[22] Filed: Feb. 24, 1978

[51] Int. Cl.² ............................................. G03B 27/58
[52] U.S. Cl. .................................................... 355/72
[58] Field of Search .................... 355/18, 27, 30, 46, 355/50, 55, 64, 72, 63, 97

[56] References Cited

U.S. PATENT DOCUMENTS

| | | | |
|---|---|---|---|
| 2,050,571 | 8/1936 | Johnson | 355/55 |
| 2,855,834 | 10/1958 | Doster | 355/64 X |
| 3,345,911 | 10/1967 | Lee | 355/64 X |
| 3,414,353 | 12/1968 | Schwardt | 355/18 X |
| 3,689,154 | 9/1972 | Swain et al. | 355/97 |
| 4,073,589 | 2/1978 | Scheib | 355/50 |

OTHER PUBLICATIONS

I.B.M. Technical Disclosure Bulletin, Tape Path For Advanced Tape Drive, vol. 8, No. 12, May 1966.

*Primary Examiner*—Donald A. Griffin
*Attorney, Agent, or Firm*—Kinney, Lange, Westman and Fairbairn

[57] ABSTRACT

A variable working distance photographic printer receives paper from a supply magazine through a first fixed opening and supplies the exposed print paper through a second fixed opening to a take-up magazine. The variable working distance is achieved with a movable paper deck within the photographic printer. Variable guides are provided between the first and second fixed openings and the movable paper deck in order to accommodate variations in the position of the movable paper deck. Variable working distances are provided, therefore, without requiring that the supply and take-up magazines be movable.

9 Claims, 3 Drawing Figures

VARIABLE WORKING DISTANCE PHOTOGRAPHIC PRINTER WITH STATIONARY PAPER MAGAZINES

BACKGROUND OF THE INVENTION

The present invention relates to photographic printers. In particular, the present invention relates to a photographic printer of the variable working distance type which uses external print paper supply and take-up magazines.

Photographic printers produce color or black and white prints or transparencies from photographic film originals (generally negatives). High intensity light is passed through the film and imaged on the photosensitive print medium (film or paper). The photographic emulsion layers on the print paper or film are exposed and subsequently processed to produce a print of the scene contained in the original.

Photographic printers have been developed which utilize supply and take-up magazines or casettes for photographic paper. This permits paper to be supplied and removed from the photographic printer without turning off all lights. Printers using magazines include the Pako Mach II, Kodak 2610, and Agfa 7560 high speed printers. In some cases, the magazines are large enough to accomodate rolls of paper up to 500 meters long.

In general, the printers which use external supply and take-up magazines have been "fixed working distance" rather than "variable working distance" printers. In other words, the distance between the negative plane and the paper plane is a fixed distance. In order to vary the magnification and therefore vary the print size, the printers have provided for some adjustment of the position of the focusing lens and for the use of interchangeable lenses for each film print size combination.

The use of interchangeable lenses for different print sizes has obvious disadvantages. Most importantly, since lenses of the required size and optical quality are expensive, the use of a large number of interchangeable lenses to accomodate the various possible film/print size combinations significantly increases the cost of the printer. In addition, any change in print sizes and formats from the sizes and formats being used may necessitate purchasing a new lens.

Variable working distance photographic printers have been developed and are in use at the present time. An example of a variable working distance photographic printer is shown in co-pending application Ser. No. 776,876 filed Mar. 11, 1977, and assigned to the same assignee as the present application. In this type of printer, both the distance between the negative plane and the lens and the distance between the negative plane and the paper plane is variable. This is achieved with a fixed negative plane by making the positions of both the lens and the paper deck adjustable.

The variable working distance printers, however, typically have not used external supply and take-up magazines, and have typically involved printers having rather small paper rolls. The support and movement of the paper deck becomes extremely difficult when very large amounts of paper have to be moved with the paper deck.

SUMMARY OF THE INVENTION

The present invention is a variable working distance printer which can accomodate external supply and take-up magazines which are stationary rather than movable. The printer of the present invention includes a movable paper deck, which is moved to vary the magnification of the optical system and thereby the size of the prints made on the print paper. This greatly reduces the number of interchangeable lenses which must be provided, and permits easy adjustment of the magnification when changes in print size and print format are desired.

The printer of the present invention has first and second fixed openings through which the print paper enters and leaves the printer. The supply magazine provides the unexposed print paper through the first fixed opening, and the take-up magazine receives the exposed print paper through the second fixed opening.

First and second variable guides guide the print paper from the respective first and second fixed openings to the movable paper deck. Variations in the movable paper deck position with respect to the fixed openings are accomodated by the first and second variable guides, so that the movement of the paper deck does not require movement of the supply and take-up magazines. In this way, adjusting the paper deck position involves only the movement of the weight of the paper deck itself, and not the additional weight of the supply and take-up rolls of paper.

DETAILED DESCRIPTION OF THE PREFERRED EMBODIMENTS

Figure 1:
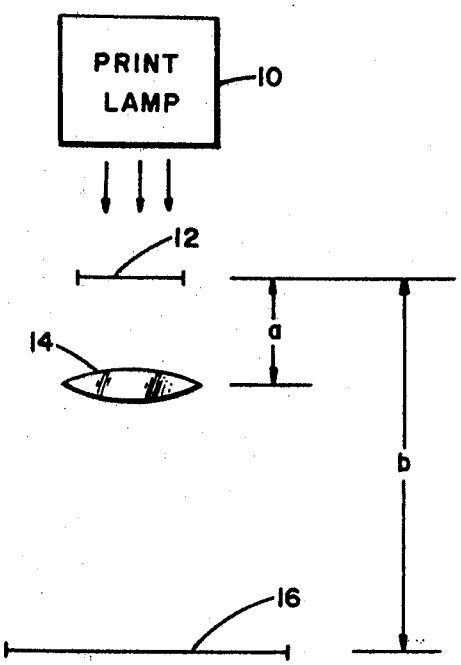
FIG. 1 illustrates the relationship of the distances from the fixed negative plane to the lens and from the fixed negative plane to paper plane in a variable working distance photographic printer.

FIG. 1 illustrates the relationships of the negative plane, the paper plane, and the lens in a variable working distance photographic printer. In a printer of this type, the negative plane is typically a fixed location, while the positions of the lens and paper deck are movable.

As shown in FIG. 1, light from print lamp 10 is directed through negative 12 at the fixed negative plane. The light passing through negative 12 is focused by lens 14 onto print paper 16. For a lens 14 of a given focal length f, the magnification m of the image from negative 12, and therefore the size of the print made on print paper 16, is related to the negative-to-lens distance a and the negative-to-paper distance b by the following relationships:

$$m = f/(a-f),$$

$$a = [f(m+1)]/m.$$

$$b = [f(m+1)^2]/m.$$

It can be seen that by varying distances a and b, it is possible to obtain a range of magnifications while using a single lens having a fixed focal length. While in many photographic printers the range of desired magnifications cannot be accomodated by a single lens, the use of variable working distance minimizes the number of interchangeable lenses which are required to provide that range of magnification. In view of the rather high cost of lenses for photographic printers, a variable working distance photographic printer has important advantages.

The present invention permits the use of variable working distances in a photographic printer of the type which uses removable external supply and take-up magazines for the print paper. The variable working distances are provided by a movable paper deck which moves independently of the supply and take-up magazines, so that the paper deck movement does not require movement of the magazines.

Figure 2A:
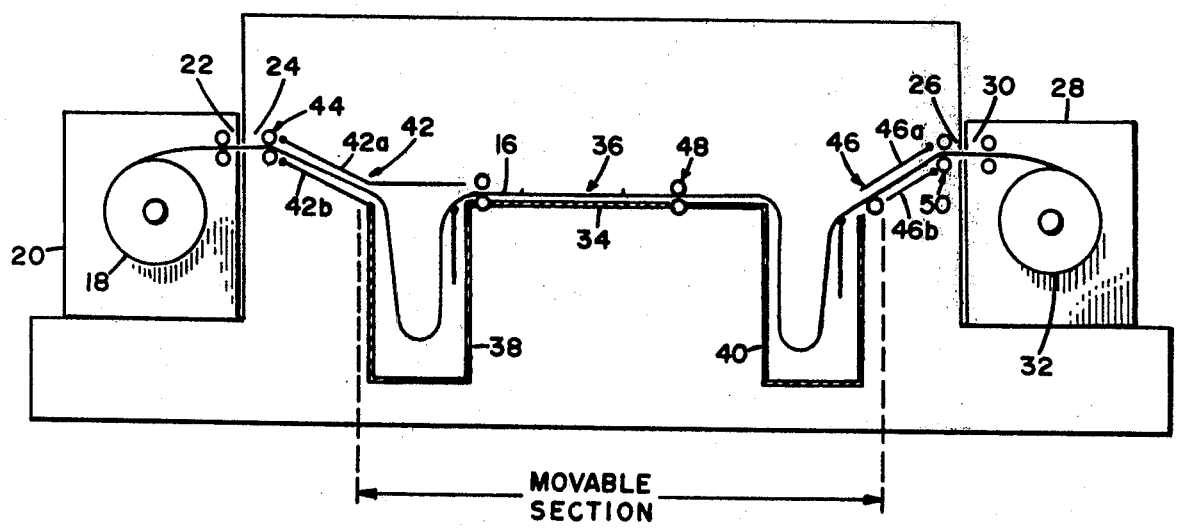
FIGS. 2A and 2B illustrate a perferred embodiment of the photographic printer of the present invention with the movable paper deck in two different positions.
Figure 2B:
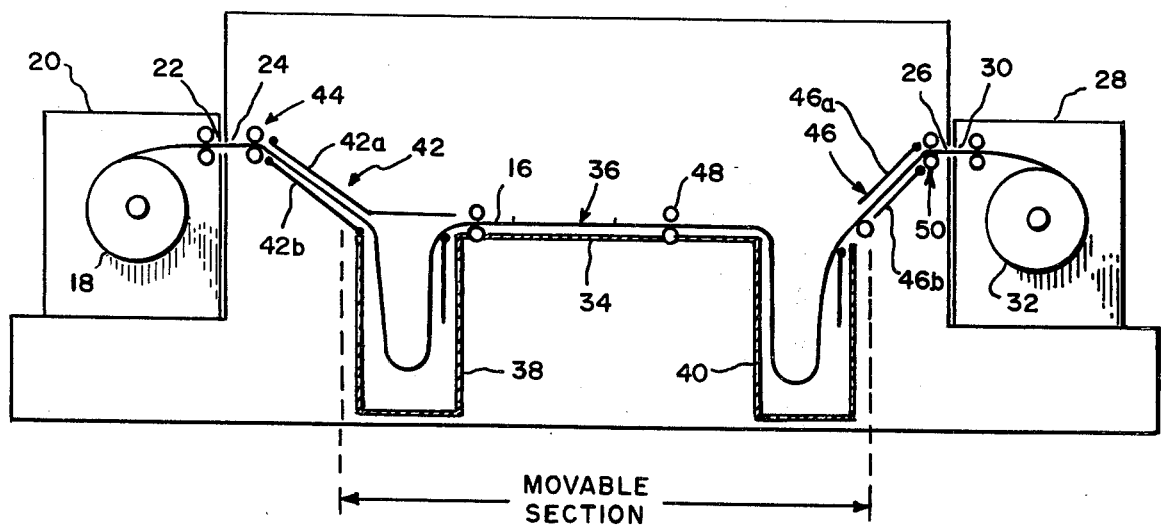

FIGS. 2A and 2B illustrate the preferred embodiment of the present invention with the movable paper deck in two different positions. For simplicity, those portions of the photographic printer unrelated to the paper deck and paper supply and take-up magazines are not shown.

As shown in FIGS. 2A and 2B, print paper 16 is supplied from a roll 18 of unexposed paper within supply magazine 20. Supply magazine 20 has an opening 22 through which paper 16 may leave supply magazine 20. The printer has a corresponding first fixed opening 24 through which paper 16 enters the printer.

On the opposite side of the printer is a second fixed opening 26 through which the exposed print paper 16 passes from the printer. Take-up magazine 28 has a corresponding opening 30 which receives the exposed print paper. The print paper is automatically driven by take-up magazine 28 onto a take-up roll 32 within magazine 28.

As shown in FIGS. 2A and 2B, supply magazine 20 and take-up magazine 28 are stationary. The variable working distance is provided by the movable paper deck 34, which supports print paper 16 at print gate 36. Print paper 16 is exposed to light which has passed through the negative and the focusing lens (not shown in FIGS. 2A and 2B). By vertical movement of movable paper deck 34, together with movement of the lens deck which holds the lens (not shown), it is possible to vary the magnification of the image printed on print paper 16 at print gate 36.

Paper 16 is guided from first fixed opening 24 to first loop pocket 38 by first variable guide assembly 42, which is formed by top and bottom guides 42a and 42b, respectively. Paper 16 is driven down guides 42a and 42b by motor-driven supply pinch rollers 44. The inlet end of the guide formed by guides 42a and 42b is fixed proximate pinch rollers 44, and the outlet end is connected to first loop pocket 38. The variable guides 42a and 42b are made of a flexible material such as spring steel so as to accomodate different vertical positions of the movable paper deck 34.

A second variable guide assembly 46 formed by top guide 46a and bottom guide 46b guides paper 16 from second loop pocket 40 to second fixed opening 26. The inlet end of guide 46 is connected to loop pocket 40, and the outlet end of guide 46 is fixed proximate second fixed opening 26. As in the case of first guide assembly 42, second guide assembly 46 is formed of flexible members which accomodate variations in position of the movable paper deck.

In the preferred embodiment shown in FIGS. 2A and 2B, first and second fixed openings 24 and 26 are located above the highest possible position of paper deck 34. This assures that paper always travels downward into first loop pocket 38, regardless of the position of paper deck 34.

In normal operation, paper 16 is fed from roll 18 within supply magazine 20 through first fixed opening 24 to motor-driven pinch rollers 44. Rollers 44 drive the paper 16 down guide 42 to first loop pocket 38, where the paper forms a first tension-free loop. Paper is driven from the first loop by motor-driven rollers 48, which are preferably driven by a high-accuracy stepper motor to provide highly accurate drive distances for the paper across movable deck 34. As the paper is advanced across paper deck 34 it enters second loop pocket 40, where it forms a second paper loop.

Paper 16 is driven from the second loop by take-up supply rollers 50, which are also motor-driven. Paper 16 travels up variable guide 46, through fixed opening 26, and into take-up magazine 28, where it is driven onto take-up roll 32.

From FIGS. 2A and 2B it can be seen that the variable guide assemblies 42 and 46 permit the use of a movable paper deck while retaining the advantages of stationary supply and take-up magazines. As a result, the much greater flexibility and significant cost advantages of a variable working distance printer are achieved without sacrificing the advantages of supply and take-up magazines and without requiring an excessively large and complicated system to move both the paper deck and the magazines.

Although the present invention has been described with reference to preferred embodiments, workers skilled in the art will recognize that changes may be made in form and detail without departing from the spirit and scope of the invention.

What is claimed is:

1. In a photographic printer of the type which receives unexposed print paper from an external supply magazine and provides exposed print paper to an external take-up magazine, the improvement comprising:
    a movable paper deck for supporting the print paper at a print gate within the printer where the print paper is exposed, the movement of the movable deck being independent of the supply and take-up magazines and being in a perpendicular direction to the plane of the print paper, and the position of the movable deck affecting the magnification of prints made on the print paper;
    a first fixed opening for receiving print paper from the supply magazine into the printer;
    first variable guide means for guiding the print paper from the first fixed opening to the movable paper deck;
    a second fixed opening for passing print paper from the printer to the take-up magazine; and
    second variable guide means for guiding the print paper from the movable paper deck to the second fixed opening.

2. The invention of claim 1 and further comprising:
    a first loop forming pocket positioned at a first end of the movable paper deck for forming a first tension-free loop between the first guide means and the movable paper deck; and
    a second loop forming pocket positioned at a second end of the movable paper deck for forming a second tension-free loop between the movable paper deck and the second guide means.

3. The invention of claim 2 wherein the first and second loop forming pockets are attached to and move with the movable paper deck.

4. The invention of claim 3 wherein the first variable guide means has an inlet end proximate the first fixed opening, an outlet end proximate the first loop forming pocket, and a flexible section extending between the inlet end and the outlet end.

5. The invention of claim 4 and further comprising:
first paper drive means positioned between the first fixed opening and the inlet end of the first variable guide means for driving the print paper.

6. The invention of claim 3 wherein the second variable guide means has an inlet end proximate the second loop forming pocket, an outlet end proximate the second fixed opening, and a flexible section extending between the inlet end and the outlet end.

7. The invention of claim 6 and further comprising:
second paper drive means positioned between the second fixed opening and the outlet end of the second variable guide means for driving the print paper.

8. The invention of claim 3 wherein the first fixed opening is located above the highest position of the movable paper deck.

9. In a photographic printer of the type which receives unexposed print paper from an external supply magazine and provides exposed print paper to an external take-up magazine, the improvement comprising:
a first fixed opening for receiving print paper from the supply magazine into the printer;
a second fixed opening for passing print paper from the printer to the take-up magazine;
a movable paper deck for supporting the print paper at a print gate within the printer where the print paper is exposed, the movement of the movable deck being independent of the first and second fixed openings and being in a perpendicular direction to the plane of the print paper, and the position of the movable deck affecting the magnification of the prints made on the print paper;
first variable guide means for guiding the print paper from the first fixed opening to the movable paper deck; and
second variable guide means for guiding the print paper from the movable paper deck to the second fixed position.

* * * * *